A. Whiteley,
Mower.
No. 341 Reissued. Jan. 8, 1856.
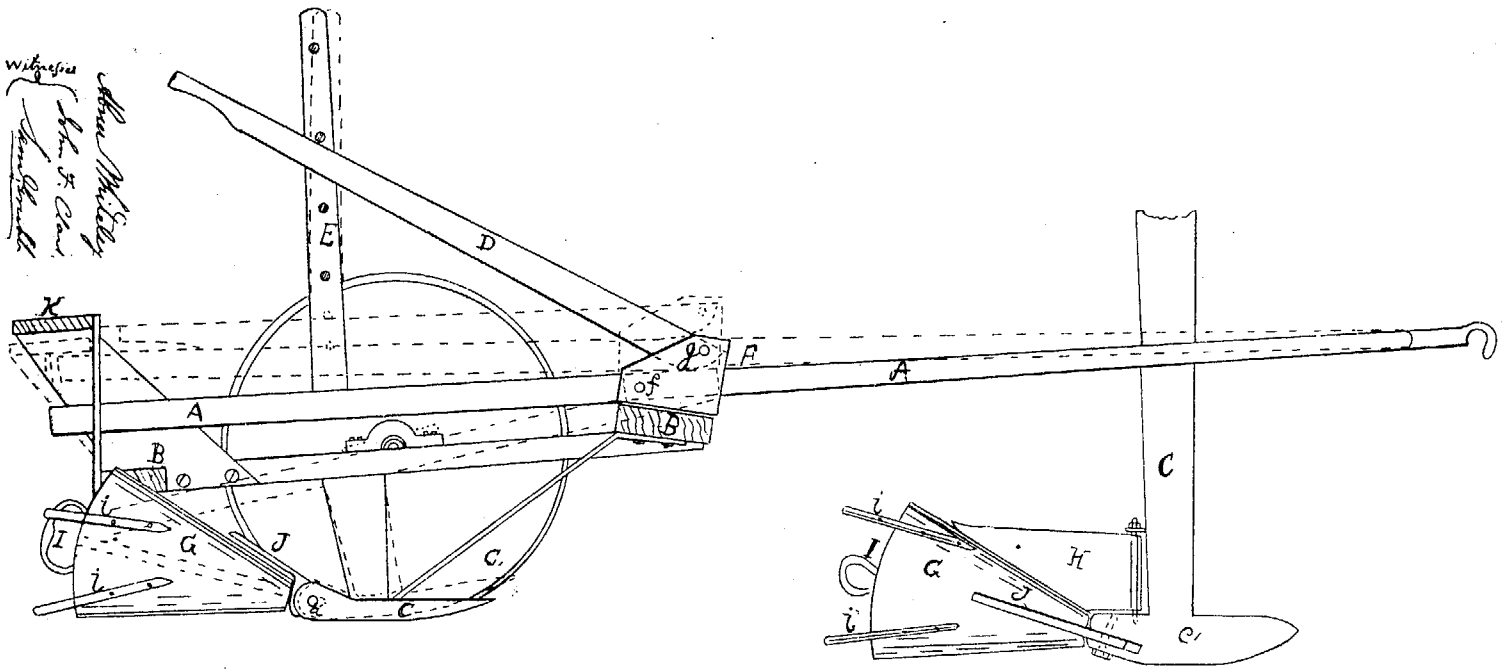

UNITED STATES PATENT OFFICE.

ABNER WHITELEY, OF SPRINGFIELD, OHIO.

IMPROVEMENT IN TRACK-CLEARERS TO GRASS-HARVESTERS.

Specification forming part of Letters Patent No. 11,579, dated August 22, 1854; Reissue No. 341, dated January 8, 1856.

*To all whom it may concern:*

Be it known that I, ABNER WHITELEY, of Springfield, in the county of Clarke and State of Ohio, have invented a new and useful Improvement in Grass-Harvesters; and I do hereby declare that the following is a full, clear, and exact description of the same, reference being had to the accompanying drawing, forming part of this specification.

In constructing my machine I connect the main frame, from which the finger-piece is suspended, and tongue with a flexible joint, in connection with attaching the finger-piece and cutters to said frame, in such manner that the finger-piece and cutters lie on the ground in or nearly in the vertical plane passing through the master-wheel shaft, so that when the end of the frame at said joint is elevated it will move the finger-piece forward and elevate the point of the fingers and cutters without moving the finger-piece off the ground, and when said joint is depressed the finger-piece will move backward, and the point of the fingers and cutters will descend close to the ground again, and also means of elevating and depressing the front end of said frame at the option of the driver while the team is in motion. Now, it will be observed that while this elevating of the points of the fingers and cutters causes them to ascend and pass over obstructions with ease, at the same time the rear of the finger-piece resting on the ground forms a gage for the height of the stubble and adapts it to the unevenness of the ground, causing it to cut a stubble of a uniform height. This adjustment becomes necessary in mowing meadows where strips of moist land occur wherein craw-fish nests abound, and from the gravel therein it is necessary to avoid as far as possible cutting into them, and when that cannot be avoided, and the top of the nest must be passed through, the evil may be abated by the inclined position of the finger-piece, which passes the gravel and clay of the nest quickly off the blades instead of remaining thereon until ground up and the edges of the knives ruined. I can thus cut over with ease and safety not only the above, but other obstructions—as clods of earth, stones, &c.—at the will of the driver while the machine is in motion, and also throw the cutters and fingers down and cut good and clear grass close to the earth. This could not be done if the machine did not admit of an immediate adjustment without stopping the team.

In the drawing, A A is the tongue, passing through or between jaws F, placed on the front portion of the frame B, and extends to the rear framing, B′, where it passes through an upright slot. Under the seat of the driver the tongue is pivoted at *f* in the jaws F.

E is an upright post, rising on A between the front and rear portions of the frame. It is furnished with holding-pins for retaining the lever D. This lever is also pivoted in the jaws F at *g*.

C is the finger-piece, connected in the usual manner with the frame B B′, and carries the fingers and knives in common mode.

The lever D has a projection below its line of motion, and by depressing it the front of the frame is elevated, and with it the points of the fingers and cutters, while the rear of the frame descends and is held in any desired position by the pins in E. While the driver is on his seat his foot may, if necessary, be applied to the rear end of the tongue, either in depressing or raising the end thereof.

The improvement which I now claim is in applying a roller-cone, G, combined with a shoe, C′, and joint-clearer, for the purpose of clearing the track in the cut grass. The cone G is armed with diagonally-placed bars *i i*, extending over the rear of the cone, and are for the purpose of facilitating the motion, and also serve to gather the grass when the height thereof exceeds the face of the roller.

I is a swing-axis on which the roller turns. J is the joint-clearing bar, (joined to the axis.) It prevents the entrance and winding of the grass at the joint at the apex of the cone.

H is a triangular plate, hinged to the rear of the finger-piece by the side of G. It feeds the cut grass to the roller, which otherwise would not throw it sufficiently out of the way.

C′ is the outside guard—by some called the "shoe." It is to this that the track-clearer is attached by a hinge pivoted at *a*. In noticing the changes of position that the guard, the knives, and the fingers assume, it must be borne in mind that the hooked end of the tongue is the point that does not change. In the drawing the extreme elevation of the point of the guard C is shown in dotted lines, also the position of the lever D when locked down on the tongue A, as well as the change in the frame carrying the finger-piece, is shown in dotted lines; and it will be readily understood how the intermediate changes may be made as well as the facility given the driver when seated on K to quickly raise or depress the rear end of the tongue and effect the desired change in the position of the finger-piece, cutters, &c.

The operation of the cone track-clearer is as follows: When, by the movement of the machine, the finger-piece is carried forward the tall cut grass falls on the cone G, which receives a rotary motion by virtue of the angle its axis I bears to the finger-piece, and turns the cut grass outward from the standing grass, the triangular piece H preventing the grass catching on the stubble. In long grass the pin H is not absolutely necessary, as the cone serves all the purposes required.

Having described my improvement, what I claim as my invention, and desire to secure by Letters Patent, is—

The rolling cone G, moving on the axis I at an acute angle to the finger-piece, and furnished with a joint-clearer, J, as described, and for the purpose of clearing a track in the cut grass.

In testimony whereof I have signed my name before two subscribing witnesses.

ABNER WHITELEY.

Witnesses:

JOHN L. SMITH,

O. C. WILSON.